United States Patent [19]

Mumby

[11] Patent Number: 5,563,512

[45] Date of Patent: Oct. 8, 1996

[54] WELL LOGGING APPARATUS HAVING A REMOVABLE SLEEVE FOR SEALING AND PROTECTING MULTIPLE ANTENNA ARRAYS

[75] Inventor: Edward S. Mumby, Houston, Tex.

[73] Assignee: Halliburton Company, Houston, Tex.

[21] Appl. No.: 259,638

[22] Filed: Jun. 14, 1994

[51] Int. Cl.⁶ .............................. G01V 3/18; G01V 3/28; F21B 49/00

[52] U.S. Cl. ..................... 324/339; 73/152.02; 175/50; 324/338; 324/369

[58] Field of Search ............... 324/323, 338–344, 324/347, 356, 369; 166/250; 175/40, 50, 321; 73/151, 152; 367/25, 35; 250/254, 256

[56] References Cited

U.S. PATENT DOCUMENTS

| | | | |
|---|---|---|---|
| Re. 32,913 | 4/1989 | Clark | 324/338 |
| 2,264,318 | 12/1941 | Lee | 324/339 |
| 2,964,698 | 12/1960 | Lehmberg, Jr. | 324/339 |
| 3,377,549 | 4/1968 | Newman et al. | 324/342 |
| 4,401,947 | 8/1983 | Cox | 324/339 |
| 4,494,072 | 1/1985 | Jeter et al. | 324/347 |
| 4,511,843 | 4/1985 | Thoraval | 324/338 |
| 4,514,693 | 4/1985 | Meador | 324/338 |
| 4,553,097 | 11/1985 | Clark | 324/338 |
| 4,651,101 | 3/1987 | Barber et al. | 324/339 |
| 4,659,992 | 4/1987 | Clark et al. | 324/338 |
| 4,785,247 | 11/1988 | Meador et al. | 324/338 |
| 4,949,045 | 8/1990 | Clark et al. | 324/338 |
| 5,134,285 | 7/1992 | Perry et al. | 250/254 X |
| 5,453,693 | 9/1995 | Sinclair et al. | 324/338 X |

FOREIGN PATENT DOCUMENTS 2146126   4/1985   United Kingdom ............. G01V 3/30

OTHER PUBLICATIONS

Coope, Dan, et al., "The Theory of 2 MHz Resistivity Tool and its Application to Measurement–While–Drilling," *The Log Analyst*, pp. 35–46 (May–Jun. 1984).

*Primary Examiner*—Gerard R. Strecker
*Attorney, Agent, or Firm*—Conley, Rose & Tayon, P.C.

[57] ABSTRACT

A well logging apparatus is disclosed having an elongate body supporting a plurality of antenna coils housed in recesses formed on the body. A sleeve covers the segment of the body containing the antenna recesses and seals the antennas from borehole fluids. Electronics compartments formed in the body for housing signal conditioning circuitry are likewise sealed by the sleeve. The sleeve includes slotted regions filled with a sealant, the slotted regions being disposed about the antenna coils and providing an electromagnetically transparent window through the sleeve.

47 Claims, 6 Drawing Sheets

WELL LOGGING APPARATUS HAVING A REMOVABLE SLEEVE FOR SEALING AND PROTECTING MULTIPLE ANTENNA ARRAYS

BACKGROUND OF THE INVENTION

The present invention relates to electrical induction logging systems and apparatus which predict the nature and characteristics of subsurface formations penetrated by a borehole. More particularly, the invention relates to induction logging tools employed in measurement-while-drilling (MWD) applications. Still more particularly, the invention relates to apparatus for sealing and physically protecting the antenna arrays and associated circuitry contained in an induction logging tool from the extreme pressures and harsh environment associated with MWD operations.

Recovery of hydrocarbons from subsurface formations typically commences by drilling a borehole through the earth to a subsurface reservoir or other location thought to contain hydrocarbons. As drilling progresses, various physical, chemical and mechanical properties are measured and "logged" for the purpose of determining the nature and characteristics of the subsurface formations, including, for example, the porosity, permeability, saturation and depth. One such logging technique commonly used in the industry is referred to as induction logging. Induction logging measures the conductivity, or its inverse, the resistivity, of the formation surrounding the borehole. Formation conductivity is one possible indicator of the presence or absence of a significant accumulation of hydrocarbons because, generally speaking, hydrocarbons are relatively poor conductors of electricity. Formation water, on the other hand, typically having a relatively high concentration of dissolved salt, is a relatively good conductor of electricity. Thus, induction logging tools can obtain information that, properly interpreted, can indicate the presence or absence of hydrocarbons.

U.S. Pat. Nos. 4,553,097, 4,659,992, 4,785,247 and Re 32,913 illustrate typical prior-art tools that operate according to the basic principles of induction logging. The downhole tool comprises at least one transmitter antenna or coil and one or more receiver coils spaced apart coaxially from the transmitter. A signal generator connected to the transmitter coil produces an alternating current within the transmitter coil. The flow of alternating current in the transmitter coil induces a magnetic field within the surrounding formation, causing eddy currents to flow circumferentially about the axis of the tool and into the formation. The eddy currents, in turn, induce a magnetic field that is coupled to the receiver coils, thereby inducing in the receiver coils a voltage signal with magnitude and phase dependent upon the electrical characteristics of the adjacent formation.

To be of use to the driller, the information received by the tool must be communicated to the surface. One prior art method of obtaining at the surface the data taken at the bottom of the borehole is to withdraw the drill string from the hole, and to lower the logging tool down the hole by means of a wire cable. Using such "wireline" apparatus, the relevant data may be transmitted to the surface via communication wires or cables that are lowered with the tool. Alternatively, the wireline logging tool may include an electronic memory such that the relevant information may be encoded in the memory to be read when the tool is subsequently raised to the surface. Among the disadvantages of these wireline methods are the considerable time, effort and expense involved in withdrawing and replacing the drill string, which may be, for example, many thousands of feet in length. Furthermore, updated information on the drilling parameters is not available while drilling is in progress when using wireline techniques.

A much-favored alternative is to position the logging tool within the drill string close to the drill bit so as to gather the formation data while drilling is in progress. Using such techniques, the transmitter and receiver coils are typically wound about a drill collar located on the lower end of the tool string. The data obtained by the tool is then transmitted to the surface by a mud pulse system of telemetry or another form of telemetry. The mud pulse system creates acoustic signals in the drilling fluid which is circulated through the drill string during drilling operations. The acquired formation data, along with data gathered by other sensors that are helpful or necessary to the driller, are transmitted by suitably timing the formation of pressure pulses in the mud stream. The pressure pulses are received and decoded by a pressure transducer and computer at the surface.

The techniques for obtaining formation data and other downhole parameters while drilling is in progress are generally termed "measurement while drilling" or MWD. MWD results in a major savings in drilling time and cost compared to the wireline methods described above, primarily because it permits important data to be transmitted up to the surface without requiring the time consuming use of a wireline tool.

In conventional MWD induction logging tools, the transmitter and receiver coils are typically mounted in a series of spaced-apart recesses that are machined into the outer surface of a drill collar. Each coil is wound about the tool within one of the recesses. The antenna wire is then typically covered and the recess filled with an insulative material, such as nitrile rubber. Such a structure is very common and is disclosed, for example, in U.S. Pat. No. 4,651,101 (FIG. 4 and accompanying text) and U.S. Pat. No. 4,785,247 (FIGS. 2A and 2B and accompanying text). U.S. Pat. No. 4,651,101 discloses another example of conventional means for mounting the receiver and transmitter coils in an induction logging tool. As shown and described with respect to FIG. 5 of that patent, the coils are wound about a central support at spaced-apart locations and are covered by a fiberglass sleeve. Pressurized oil surrounds the coils and fills the annular space between the central support and the fiberglass sleeve. Pressure compensation devices are provided to maintain the oil at a pressure higher than the pressure of the borehole fluids so that the differential pressure on the fiberglass sleeve will be small and so as to prevent the delicate antenna arrays from becoming damaged.

In addition to the antennas themselves, there are usually a variety of electronic devices that must be mounted near the antennas in order for the data retrieval system to function properly. These electronics packages usually take the form of printed circuit boards which perform certain signal conditioning functions, such as amplification or tuning. As disclosed, for example, in FIG. 27 of U.S. Pat. No. 4,949, 045, the electronics are typically housed in compartments that are machined into the drill collar at locations that are spaced-apart from the recess in which its associated antenna coil is embedded. Each electronics compartment includes a cover that is meant to seal the electronics from the drilling fluids flowing in the borehole. A wireway interconnects each electronics compartment with the recess in which its associated antenna is embedded. Because the electronics must be sealed from the drilling fluids flowing in the borehole, and because the antenna recesses are not sealed from the intrusion of drilling fluids, a specialized and costly hermetic bulkhead feedthrough device must be positioned in each wireway between the electronics compartment and the antenna recess to ensure that no fluid in the antenna recesses passes into the electronics compartment.

Although MWD induction logging tools have gained great acceptance, the present tools suffer from a variety of shortcomings. First, the antenna coils are generally not well protected under present-day designs. The insulation covering the recesses in which the coils are embedded is frequently torn or punctured by the borehole when subjected to the hostile downhole environment associated with MWD applications. When the insulation is damaged or destroyed by abrasion or otherwise, the antenna themselves may be destroyed. Further, the pressure feedthroughs may also be damaged, allowing drilling fluid to escape into one or more of the electronics compartments and damaging or destroying those signal conditioning components as well. A fiberglass sleeve such as that shown in U.S. Pat. No. 4,651,101 adds little in the way of protection as it is easily punctured or otherwise damaged due to the tremendous forces imparted to the tool in operation, particularly during steerable or directional drilling operations where enormous side wall forces are imparted to the tool.

Damage to the logging tool has the obvious effect of necessitating repairs to the tool and the replacement of some or all of its internal electronics and antennas. However, the economic harm caused by a damaged MWD tool is even more substantial than the costs associated with simply making such repairs. The true economic harm can be better appreciated when it is considered that the damage and the resulting loss of signal from the MWD tool will necessitate a time consuming and extremely costly procedure where the entire drill string must be removed from the borehole, one pipe section at a time, so as to bring the damaged tool to the surface for repair or replacement. Then, after such repairs are completed, the drill string and the tool must be replaced in the hole. The high labor and equipment costs incurred by the driller during this unproductive period where no hole is being drilled can be economically disastrous.

Adding further to the harm caused by a damaged logging tool is the fact that even after a damaged tool has been removed from the hole, it is frequently very difficult to repair the tool in the field. Typically, when damage occurs so as to cause one electronics compartment to be contaminated by drilling fluids, all or at least some of the other compartments will likewise be affected. In certain of the prior art tools, each electronics compartment is covered by a separate access panel. Each panel must be removed by extracting a number of screws or similar fasteners. Removing a number of these panels, cleaning the compartments, replacing and testing the electronics, and then replacing the panels using the many individual fasteners can be a very time consuming and thus costly task.

As is apparent, then, despite the advances made in MWD and induction logging technology over the years, there remains a need within the industry for an induction logging tool that will better survive the harsh duty to which MWD tools are subjected. More specifically, improvements in the area of sealing and protecting the antenna arrays and associated electronics would be welcomed by the industry. Preferably, an MWD logging tool could be developed that would be highly resistant to the damage caused by abrasion and punctures to the insulative materials that are presently used to surround the antenna arrays on conventional tools. It would be further desirable if the tool would simply and effectively seal and protect all the antenna arrays and electronics that are housed within the tool, without reliance on a number of separate and discrete access panels. Ideally, the electronics compartments and antenna recesses of the tool would all be sealed by a single, easily removable cover, so as to eliminate the need for separating the electronics compartments from the antenna recesses. Such a feature would eliminate the need to rely on costly pressure feedthroughs for the interconnecting wiring and allow the signal conditioning electronics and antenna all to operate at atmospheric pressures.

SUMMARY OF THE INVENTION

Accordingly, there is described herein a well logging apparatus having a removable sleeve which seals and protects multiple antenna arrays that are housed in a drill string. The apparatus is ruggedly constructed and highly effective at sealing both the antenna arrays and the electronics compartments housing the signal conditioning circuitry associated with each antenna. The sleeve is easily removable so as to allow access to the antenna coils and electronics compartments.

The apparatus generally includes an elongate support body having a general cylindrical outer surface, one or more circumferential recesses formed in that outer surface, an antenna coil supported within each recess, and a tubular metallic sleeve disposed over the body and sealing the antenna coils from the fluids in the borehole. The device includes slotted regions that are disposed about each antenna coil so as to allow the desired electromagnetic signals to pass through the sleeve. The slotted regions are filled and sealed with a nonmetallic sealing compound, such as, for example, an elastomer. An insulative insert may be disposed in the slot beneath the layer of sealing compound. It is preferred that the edges of the slots as well as the plastic insert be beveled so as to provide a better and more reliable seal. The sealing compound is recessed from the outer surface of the sleeve so as to lessen the possibility of the compound being torn or damaged.

The apparatus may also include electronics compartments formed in the support body adjacent to the antenna recesses for housing printed circuit boards containing signal conditioning circuitry. The sleeve may be keyed to the support body so that it can be easily removed to allow access to the antenna coils and associated electronics without the need for removing and later inserting a number of threaded fasteners. Hardfacing bands are disposed about the sleeve's outer surface on each side of the slotted regions to provide added protection to the antenna coils and to the sealing compound disposed in the slots.

The invention may include an instrumentation enclosure at one end of the support body and individual wireways connected between the instrumentation enclosure and each electronics compartment. The sleeve seals and maintains at atmospheric pressure the antenna recesses, the electronics compartments, and the wireways so as to eliminate the need for costly hermetic electrical feedthrough connectors within the support body.

Thus, the present invention comprises a combination of features and advantages which enable it to substantially advance MWD and logging technology. These and various other characteristics and advantages of the present invention will be readily apparent to those skilled in the art upon reading the following detailed description and referring to the accompanying drawings.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

Figure 1:
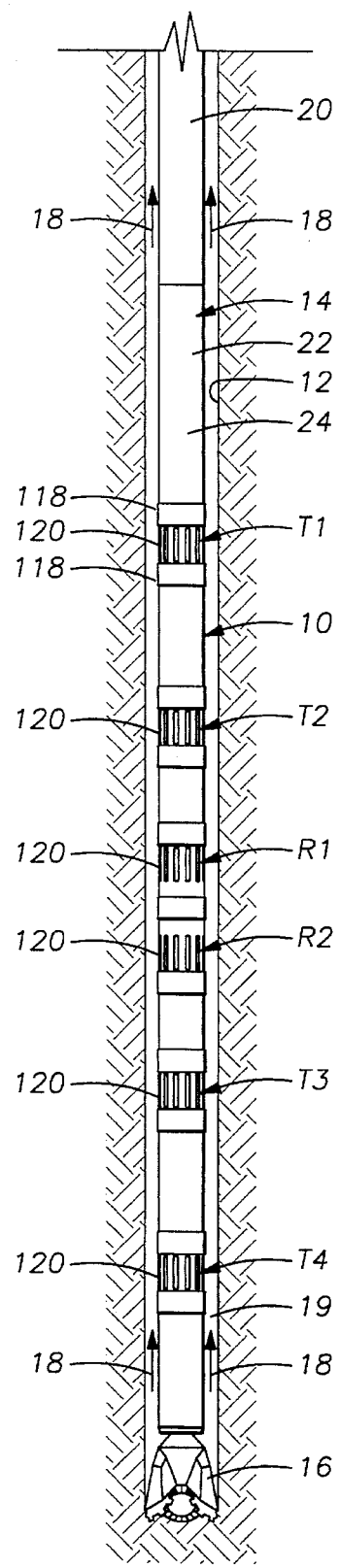
FIG. 1 shows an induction logging tool of the present invention employed in a drill string and positioned in a borehole.

Referring to FIG. 1, there is shown an embodiment of an induction logging tool 10 made in accordance with the teachings of the present invention. Logging tool 10 is particularly suited for use in Measurement-While-Drilling (MWD) applications.

As shown in FIG. 1, a borehole 12 is formed in the earth by rotary drilling. A drill string 14 is suspended within the borehole 12 and includes a drill bit 16 at its lowermost end. The drill string 14 and the drill bit 16 are rotated by known means, such as by a conventional rotary table that is positioned on a drilling platform (not shown) positioned over the borehole. Drilling fluid, sometimes referred to herein as "mud," is pumped from the surface down through the drill string 14 and into the borehole 12 to remove cuttings and also to cool and, in some instances, to lubricate the drill bit 16. The drilling fluid exits the bottom of the drill string 14 via ports (not shown) formed in the drill bit 16 and, as represented by arrows 18, circulates back to the top of the borehole 12 in the annular region 19 between the outside of the drill string 14 and the periphery of the borehole 12. As explained more fully below, logging tool 10 is disposed between drill bit 16 and a drill collar 20 and forms a portion of drill string 14. Although the logging tool 10 of the present invention is not limited to any particular number or type of transmitter or receiver coils, the preferred embodiment includes four transmitters, shown generally at T1 through T4, and two receivers, generally shown at R1 and R2. Also, although drill string 14 is shown in a substantially vertical orientation in FIG. 1, it will be understood that in directional drilling applications, that portion of drill string 14 which includes logging tool 10 may be positioned in any number of other inclinations, and may even be positioned in a horizontal or substantially horizontal orientation.

Figure 2A:
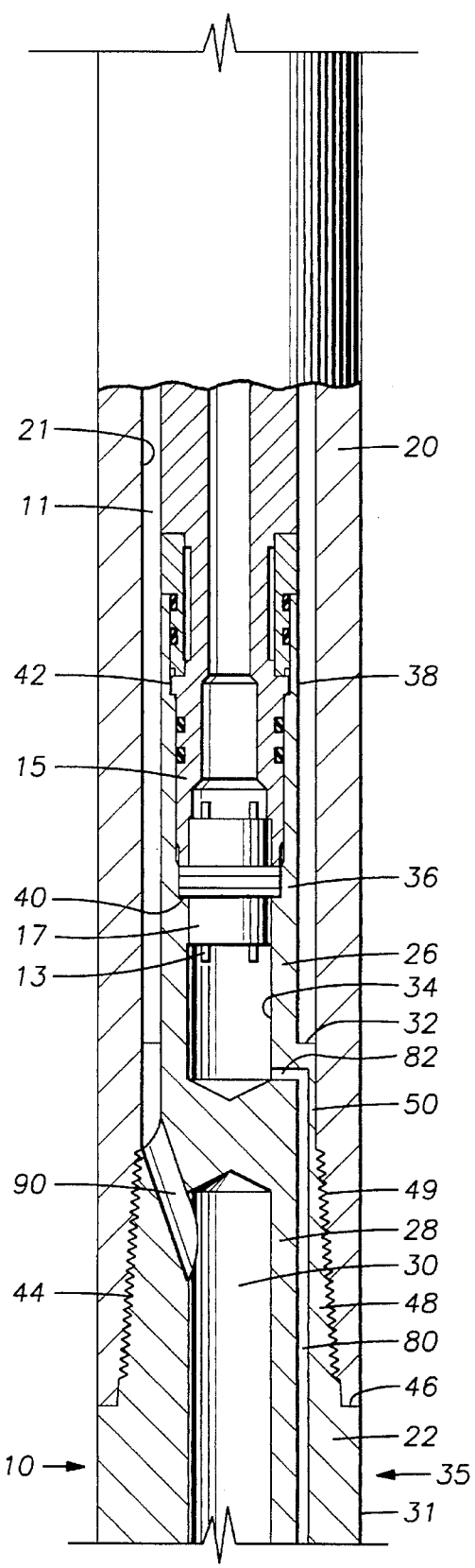
FIGS. 2A, 2B, 2C are partial cross sectional views of the logging tool shown in FIG. 1—FIG. 2A showing the upper portion of the tool, FIG. 2B showing the middle portion, and FIG. 2C showing the lower portion.
Figures 2B, 8:
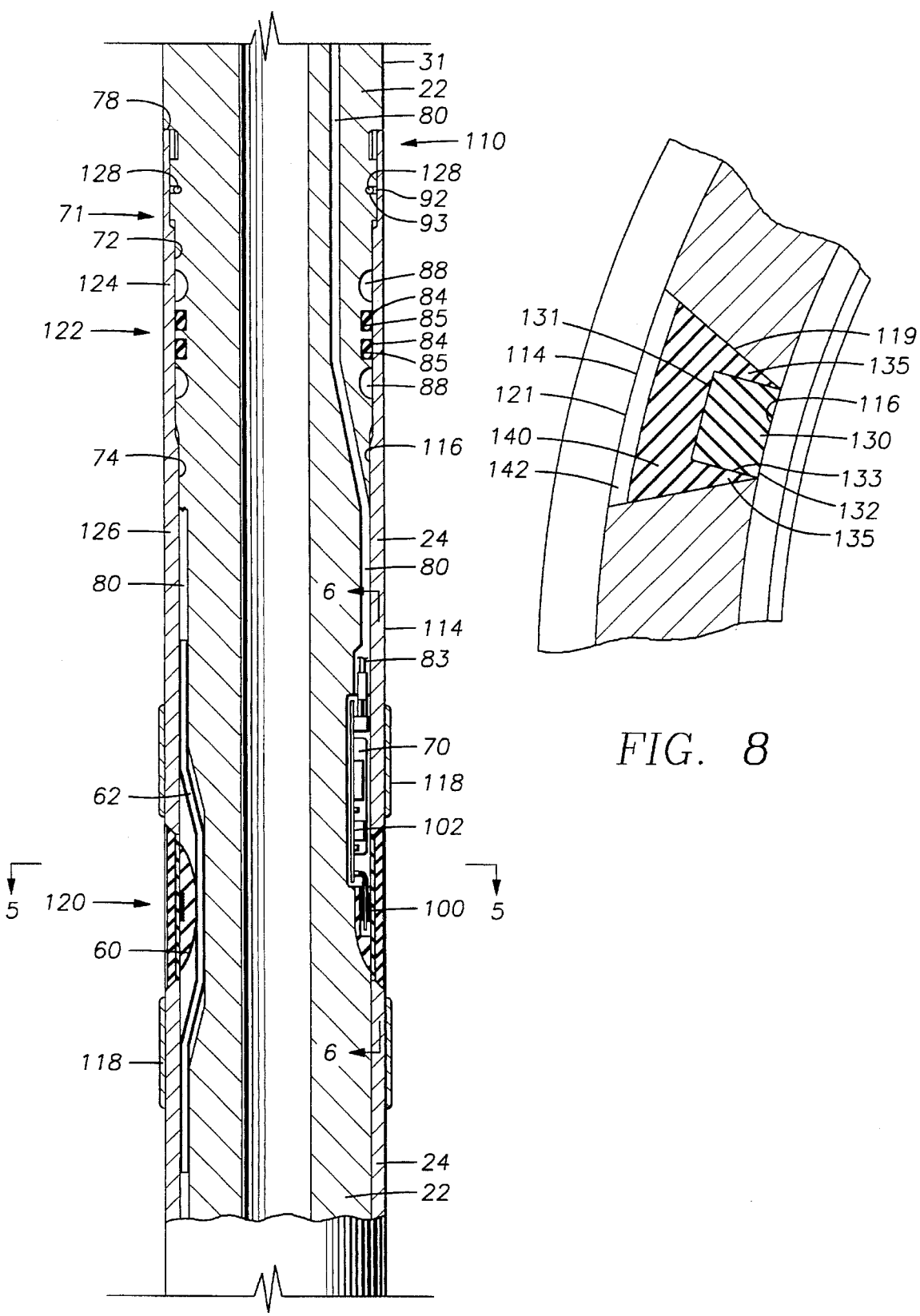
FIG. 8 is an enlarged view of a portion of the protective sleeve shown in FIG. 5.
Figure 2C:
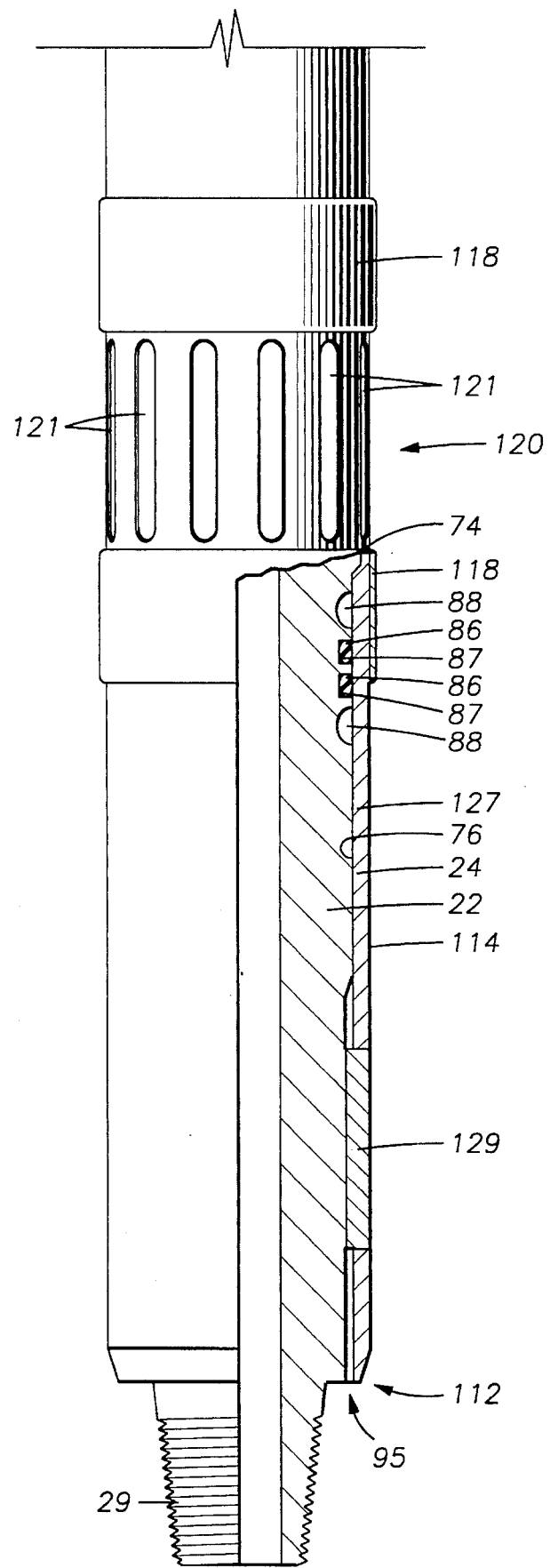

Referring now to FIGS. 2A–2C, logging tool 10 generally includes a mandrel 22 and a removable sleeve 24 that is slidingly disposed about the outer surface of mandrel 22. Mandrel 22 interconnects drill bit 16 and drill collar 20. Sleeve 24 is disposed about the outer surface of mandrel 22 to seal and to protect the various antenna arrays and electronics packages housed within mandrel 22 as explained more fully below.

Mandrel 22 generally comprises an instrumentation receiving portion 26, a body portion 28, and pin 29, all integrally formed from a drill collar. Instrumentation receiving portion 26 engages an electronics housing 15 which contains various electrical devices and circuitry necessary for gathering a variety of drilling parameters and desirable formation data and transmitting the collected data to the surface via one of a number of known telemetry means. Mandrel body 28 supports the various transmitter and receiver coils and associated signal conditioning electronics, and also serves as a conduit for electrical wiring and drilling fluid. Pin 29 provides a means to attach the drill bit 16 to drill string 14.

Referring now to FIG. 2A, instrumentation receiving portion 26 of mandrel 22 includes a central longitudinal bore 34 and a generally cylindrical wall 36 having outer surface 38. Receiving portion 26 is connected to mandrel body portion 28 at shoulder 32. Wall 36 sealingly engages a conventional electronics housing 15 in drill collar 20. Bore 34 in mandrel 22 forms a portion of a conduit for wires 83 (FIG. 2B and 6) which interconnect the various signal conditioning circuits that are located in the logging tool 10 with circuits housed in electronics housing 15.

Bore 34 terminates in mandrel body portion 28 at a position below shoulder 32. Bore 34 includes one or more counterbores, such as counterbores 40, 42. A hermetic pressure bulkhead 17 is disposed in bore 34 and bears against the shoulder formed by counterbore 40. Bulkhead 17 includes connector pins 13 which serve as landings and terminations for wires 83 (FIG. 2B) which terminate in bore 34. Although bulkhead 17 typically would include many such pins 13, for clarity, only two of the pins are shown in FIG. 2A extending from bulkhead 17 in bore 34. Bore 34 is intended to remain at atmospheric pressure while logging tool 10 is in the borehole 12; however, should a failure occur that would allow drilling fluid to enter bore 34, the pressure bulkhead 17 would prevent the fluid from entering electronics housing 15 and damaging the sensitive and costly devices contained therein.

Referring again to FIGS. 2A–2C, body portion 28 of mandrel 22 has a generally cylindrical shape and includes an outer surface 31 and a central longitudinal bore 30. Central bore 30 is coaxially aligned with, but does not intersect, bore 34 in instrumentation receiving portion 26. As best shown in FIG. 2A, the upper portion of mandrel body 28 includes a neck 44 which extends between shoulder 32 and shoulder 46. Neck 44 generally includes a frustoconical segment 48 and a cylindrical extension 50. Frustoconical segment 48 includes a threaded portion 49 for connecting mandrel 22 to the lower end of drill collar 20. Frustoconical segment 48 tapers between shoulder 46 and cylindrical extension 50. Extension 50 is connected to instrumentation receiving portion 26 and terminates at shoulder 32. An annulus 11, used to transport drilling fluid to drill bit 16, is provided between inside surface 21 of drill collar 20 and the outer surface 38 of instrumentation receiving portion 26. Annulus 11 terminates at shoulder 32 of mandrel neck 44.

Referring to FIGS. 2A and 2B, below neck 44, mandrel body 28 includes a segment 35 of unreduced cross sectional area which is connected to a tapered segment or region 71. As best shown in FIG. 2B, tapered region 71 begins at sleeve shoulder 78 and is formed by a series of adjacent sections of reduced diameter 72, 74 and 76 (shown in FIG. 2C). As explained in more detail below, tapered region 71 engages an oppositely tapered region 122 on the inner surface 116 of sleeve 24 so as to provide a tight fit between sleeve 24 and mandrel body 28. In the preferred embodiment described herein, segment 35 has an outside diameter of 4.75 inches, and reduced diameter sections 72, 74 and 76 have outside diameters of 4.25, 4.11, and 4.00 inches respectively. A pair of upper seal glands 84 are formed in reduced diameter section 72 of mandrel body 28. Upper seals 85 are preferably elastomeric o-rings and are disposed in glands 84 for sealingly engaging sleeve 24. Similarly, a pair of lower seal glands 86 (FIG. 2C) are formed in reduced diameter section 76 of mandrel body 28. Lower seals 87 are elastomeric O-ring seals that are retained in glands 86 and seal between sleeve 24 and mandrel body 28. A stress relieving groove 88 is disposed on each side of the seal pairs 85, 87. Grooves 88 concentrate the stress in the radius of the grooves during downhole flexing of the logging tool 10. These grooves 88 prevent stressing the tool 10 in the areas of the seal glands 84, 86 and thus serve to maintain the seal integrity.

Mandrel body 28 also includes annular recesses 60 which are machined into its outer surface 31 at axially spaced-apart locations along the length of reduced diameter region 74, one of such recesses 60 being visible in FIG. 2B. It is preferred that each recess 60 be approximately 3.0 inches wide and have a depth of approximately 0.34 inches at its deepest point. Disposed within each recess 60 is a transmitter or receiver coil 100, described below. Adjacent to each recess 60, an elongate electronics compartment 70 is formed in mandrel body 28. Electronics compartment 70 intersects the adjacent recess 60 such that the recess 60 and the compartment 70 form one continuous chamber. Electronics compartment 70 houses a printed circuit board 102 which contains the electronic signal conditioning circuits necessary for performing certain desired signal manipulations, such boards including, as examples, impedance matching circuits, preamplifier or amplifier circuits, filters or other signal conditioning circuitry.

Recesses 60 and compartments 70 are machined into the outer surface 31 of mandrel body 28 to a depth necessary to house the antenna coils 100 and necessary circuit boards 102, but not so deep as to compromise the mechanical integrity of the drill string 14. Generally, the electronics compartment 70 will have a depth that is slightly greater then the depth of the recess 60. It is preferred that the compartment 70 be approximately five inches long, one inch wide and 0.5 inches deep.

Figure 3:
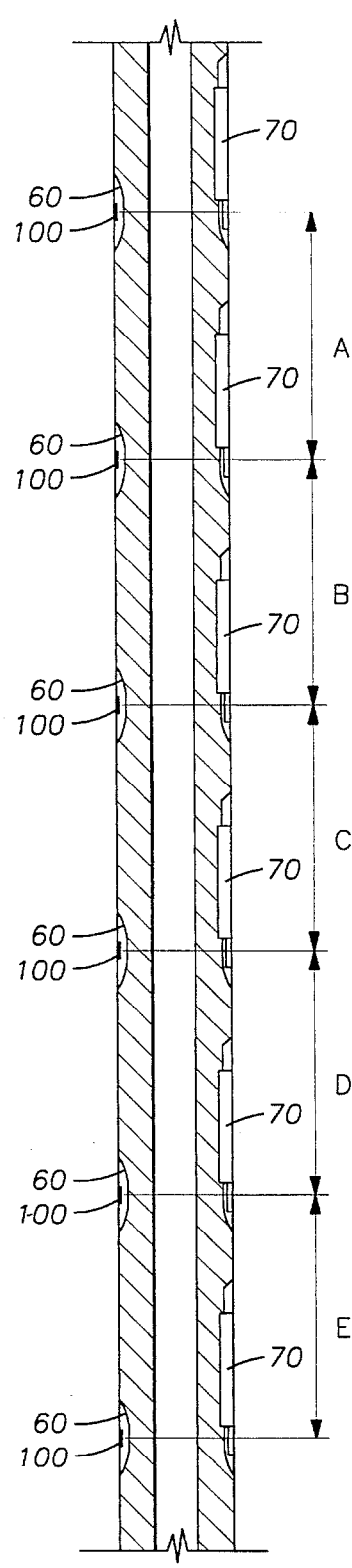
FIG. 3 is a schematic representation showing the various antenna recesses and electronics compartments in the logging tool of FIG. 1.

In the preferred embodiment of the invention, mandrel body 28 includes six recesses 60 and six electronics compartments 70 as shown schematically in FIG. 3. This arrangement provides one recess 60 and one compartment 70 for each of the transmitters T1–T4 and receivers R1 and R2. Although electronics compartments 70 are shown diagrammatically in FIG. 3 as if they were all aligned and formed along the same arcuate segment of mandrel body 28, in the preferred embodiment, the six electronics compartments 70 are circumferentially spaced apart by approximately 60 degrees along the outer surface 31 of mandrel body 28.

As understood by those skilled in the art, the axial spacing between the recesses 60 will vary depending on the desired spacing of the transmitter and receiver coils 100. This spacing, in turn, depends on variables such as the number of receiver and transmitter coils being employed, and the desired depth of investigation into the formation. Thus, it should be understood that the present invention is not limited as to the number or axial placement of coils 100 or recesses 60; however, in the preferred embodiment described herein, recesses 60 are spaced according to the following dimensions as understood with reference to FIG. 3:

| Dimension | Spacing (Inches) |
| --- | --- |
| A | 15 |
| B | 6 |
| C | 8 |
| D | 6 |
| E | 15 |

Figure 4:
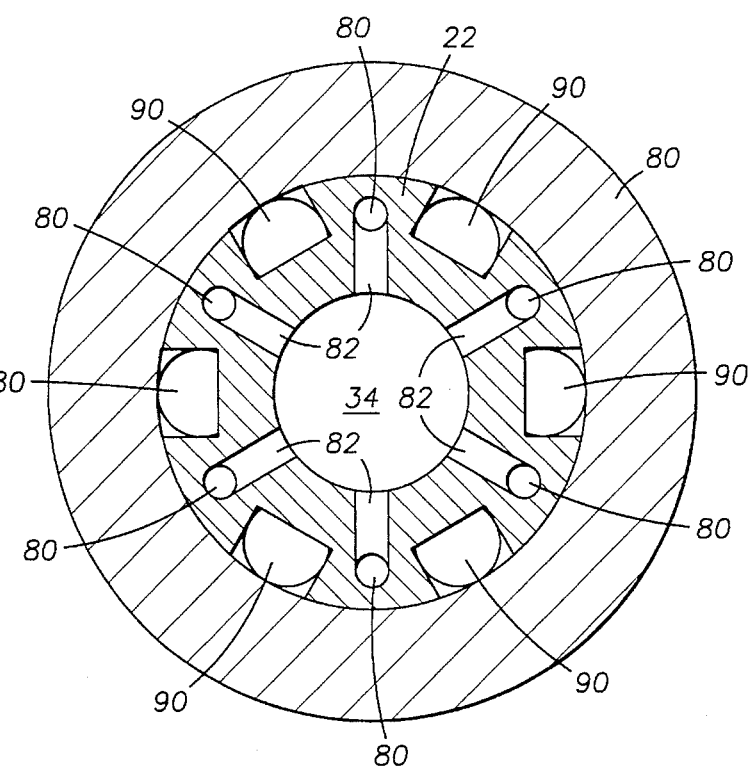
FIG. 4 is a cross sectional view taken along line 4—4 in FIG. 2A.

Referring now to FIGS. 2A, 2B, and 4, mandrel body 28 further includes longitudinal wire channels 80 for interconnecting each electronics compartment 70 with bore 34 in instrumentation receiving portion 26. In the preferred embodiment of the invention, which employs six compartments 70, there are six wire channels 80 circumferentially disposed about central bore 30 in mandrel body 28. As best shown in FIG. 2B, a wire channel 80 is formed longitudinally from each compartment 70 into mandrel neck 44. A radial bore 82 (FIG. 4) interconnects each wire channel 80 with bore 34 to complete each wireway. Wire channels 80 and radial bores 82 thus form conduits for the wires 83 (FIG. 2B) which are used to interconnect printed circuit boards 102 in compartments 70 with the pins 13 in pressure bulkhead 17 in instrumentation receiving portion 26. Where wire channels 80 pass through a recess 60, a length of conduit or tubing 62 is positioned in recess 60 beneath antenna coil 100 and insulation 98 for retaining wires 83.

As best shown in FIGS. 2A and 4, mandrel body 28 further includes a plurality of drilling fluid passages 90 formed in neck 44 for interconnecting central bore 30 with annulus 11 in drill collar 20. Fluid passages 90 are formed about central bore 30 and are circumferentially spaced-apart between wire channels 80. In the preferred embodiment of the invention, body 28 includes six fluid passages 90. Together, fluid passages 90 and central bore 30 in mandrel 22 comprise the preferred means for conducting drilling fluid through the drill string 14 to drill bit 16. It will be understood by those skilled in the art, however, that provision for the flow of drilling fluid through mandrel 22 may be accomplished in a variety of other ways as well.

Figure 6:
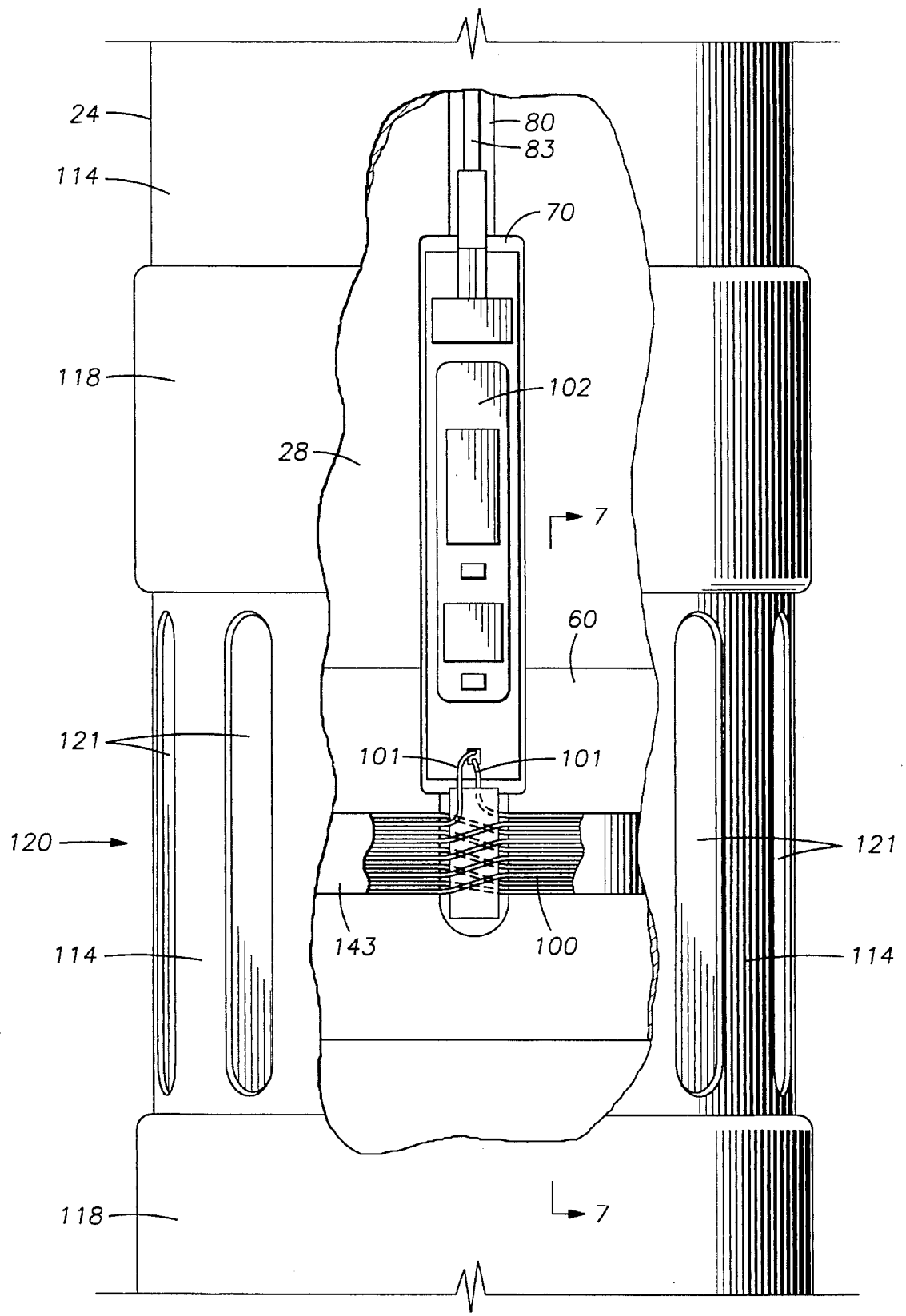
FIG. 6 is a top view of a portion of the logging tool shown in FIG. 2A with a portion of the protective sleeve shown cut away.
Figure 7:
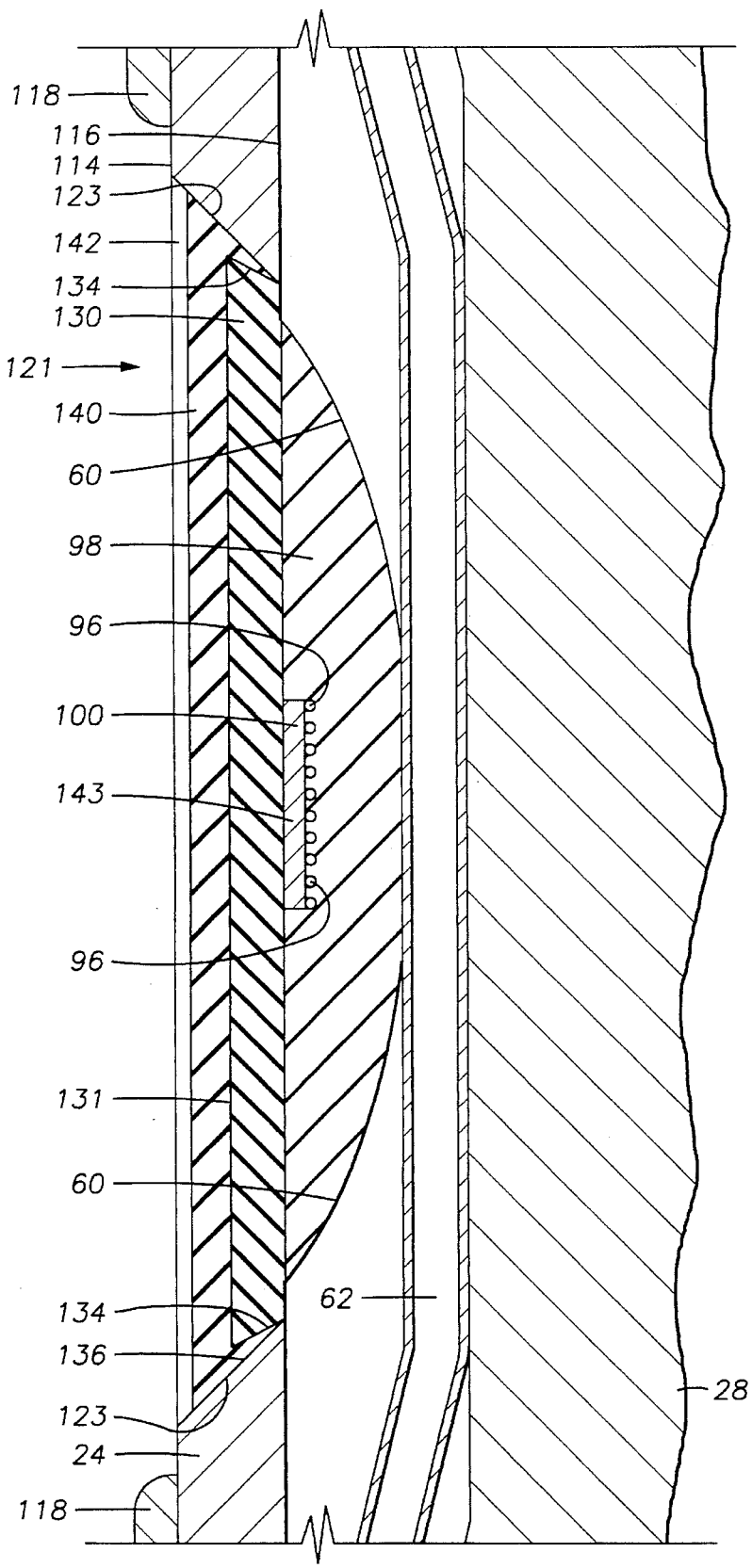
FIG. 7 is a partial cross sectional view taken along line 7—7 in FIG. 6.

Referring now to FIG. 2B, 6 and 7, each transmitter and receiver coil 100 is wound on an insulating medium 98 that is disposed about mandrel body 28 within recess 60. Insulating medium 98, preferably is fiberglass epoxy that is formed in recess 60 and machined to include grooves 96 for receiving and retaining each turn of wire coil 100, best shown in FIG. 7. An insulating band or clip 143 is disposed over wire coil 100 in recess 60. Clip 143 is preferably made from a thin-walled band of fiberglass epoxy that has been cut to permit the ends of the band to be spread apart so that the band will fit over the circumference of wire coil 100. Clip 143 provides protection for coils 100 and a smooth external surface for sleeve 24 to rest against. As shown in FIG. 6, the ends 101 of coil 100 are connected to printed circuit board 102 which contains the signal conditioning circuitry for coil 100.

Mandrel body 28 includes a pair of upper keyways 92 and a lower keyway 95. Shown in FIG. 2B, each upper keyway 92 is formed by a laterally directed groove or channel in outer surface 31 in section 72 of the tapered region 71. Upper keyways 92 are sized so as to receive a roll pin 93 described below. Lower keyway 95 is shown in FIG. 2C and comprises a longitudinal groove that is formed in reduced diameter section 76 adjacent to pin 29. As understood from the discussion which follows, keyways 92 and 95 cooperate to secure sleeve 24 about mandrel 22 and to provide for the correct angular orientation of sleeve 24 on mandrel 22. Key 95 also allows full make up torque to be transmitted to pin 29 when assembled in a drill string.

Sleeve 24 is best understood by referring to FIGS. 2B and 2C. As shown therein, sleeve 24 is a relatively thin and generally tubular member having upper and lower ends 110, 112 respectively. Sleeve 24 includes an outer cylindrical surface 114 and an inner surface 116. Preferably, sleeve 24 is made of non-magnetic stainless steel and has an overall outer diameter of 4¾ inches which is substantially the same as the outer diameter of mandrel body 28 at its unreduced diameter section 35. Tubular sleeve 24 is of sufficient length to cover all the antenna recesses 60 and electronics compartments 70 that are formed on the mandrel 22.

As best shown in FIGS. 2B and 2C, the inner surface 116 of sleeve 24 includes a tapered region 122 near upper end 110 so that sleeve 24 can receive and sealingly engage the inversely tapered region 71 of mandrel body 28. Tapered region 122 is preferably formed by a pair of counter bores so as to form a region of intermediate thickness 126 and a thin-walled end portion 124. As best shown in FIG. 2B with sleeve 24 disposed about mandrel body 28, the intermediate thickness portion 126 of sleeve 24 engages the second region of reduced diameter 74 of mandrel body 28. So disposed, the thin-walled end portion 124 of sleeve 24 sealingly engages the first region of reduced diameter 72 of mandrel body 28 and sleeve end 110 abuts sleeve shoulder 78. The lower segment of sleeve 24 includes a non-tapered region 127 of unreduced thickness (FIG. 2C) that sealingly engages the third or lower-most region of reduced diameter 76 of mandrel body 28. Together, the tapered region 122 and non-tapered region 127 of sleeve 24, in conjunction with the reduced diameter regions 72, 74 and 76 of mandrel body 28, cooperate to provide a tight fit when sleeve 24 is positioned on the mandrel body 28. The upper sealing diameter 72 of mandrel body 28 is substantially larger in diameter than the lower sealing diameter 76, thus when the mandrel and sleeve are positioned in the borehole, hydrostatic pressure will exert a force on the sleeve 24 urging it upward with respect to the mandrel body 28, thereby causing sleeve 24 to engage the mandrel body 28 even more securely. Preferably, intermediate region 126 of sleeve 24 is approximately 0.31 inches thick and thin-walled portion 124 is approximately 0.25 inches thick. The non-tapered segment 127 of sleeve 24, that segment of sleeve 24 having an unreduced thickness, preferably has a thickness of 0.38 inches and an inside diameter of 4.0 inches. As these dimensions make clear, there is thus provided a close fit between the outside surface 31 of mandrel body 28 and the inner surface 116 of sleeve 24. The close fit allows sleeve 24 to deflect slightly due to down hole pressures. Yet, because sleeve 24 is supported by mandrel body 28, sleeve 24 can withstand the full downhole hydrostatic pressure, even given its relatively thin-walled structure.

In the preferred embodiment, sleeve 24 includes six slotted regions 120 that are axially spaced-apart along the length of mandrel body 28, each slotted region 120 being positioned about one of the antenna recesses 60. Each slotted region 120 is formed by a number of circumferentially spaced slots 121. Slots 121 are formed in the longitudinal direction in sleeve 24. The width, length, number and spacing of slots 121 in each slotted region 120 are chosen so a sufficient amount of the desired electromagnetic signal can propagate through sleeve 24 and into, or out from, the formation without adversely affecting the mechanical strength of sleeve 24. In this manner, slotted region 120 forms an electromagnetically transparent window through sleeve 24. In the preferred configuration described herein, each slotted region 120 includes 12 slots 121 which are spaced apart about 30 degrees along the circumference of the sleeve 24.

Figure 5:
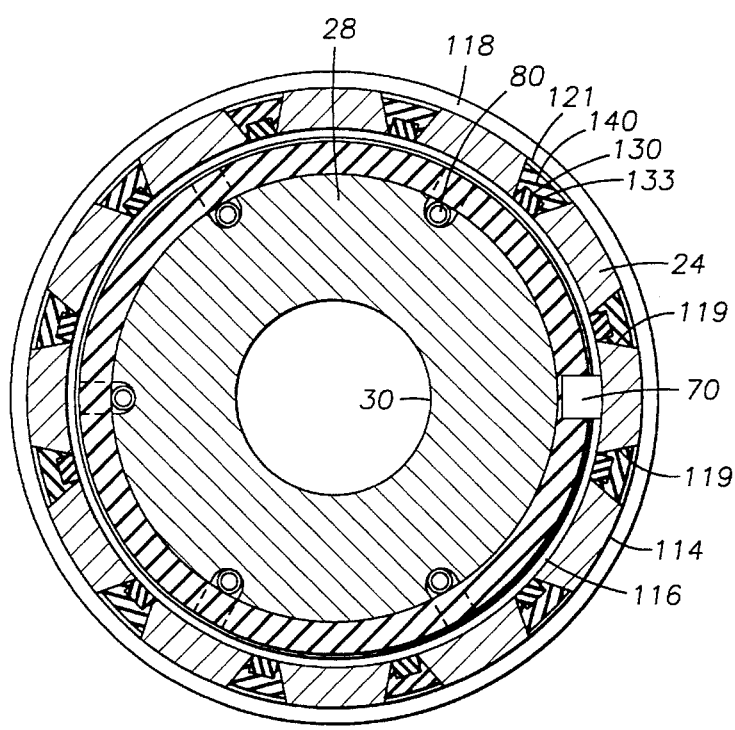
FIG. 5 is a cross sectional view taken along line 5—5 in FIG. 2B.

As best shown in FIGS. 5 and 8, the sides or edges 119 of each slot 121 are beveled, such that slot 121 is widest at outer sleeve surface 114 and narrowest at inner sleeve surface 116. It is preferred that the slots 121 be approximately ½ inch wide as measured at outer surface 114 and approximately 3/16 inch wide at inner surface 116. Likewise the end surfaces 123 of slots 121 are also beveled as best shown in FIG. 7. Ends 123 of slots 121 taper from their widest and outermost location to a thinner innermost position. It is preferred that the ends 123 are beveled such that slots 121 are 3.70 inches long as measured on outer sleeve surface 114 and 3.37 inches long as measured along inner sleeve surface 116.

Referring still to FIGS. 5, 7 and 8, disposed in each slot 121 is an elongate insert 130. Insert 130 is preferably made of a rigid insulative plastic such as poly ether etherketone or another relatively stiff insulative material and is configured so as to fit snugly into the bottom of slot 121. Inserts 130 include an outwardly facing surface 131 and an inwardly facing surface 132. When disposed in slot 121, inwardly facing surface 132 is substantially aligned with inner surface 116 of sleeve 24. Insert 130 further includes beveled side surfaces 133 which preferably are beveled or tapered at a smaller angle than the bevel of edge surfaces 119 of slot 121 as best shown in FIG. 8. The end surfaces 134 of inserts 130 are likewise tapered or beveled at a smaller angle compared to the bevel of ends 123 of slots 121 (FIG. 7). Disposed atop each insert 130 is a layer of sealing compound 140 which, in the preferred embodiment of the invention, is an elastomer, such as nitrile. Epoxy or certain other non-metallic compounds may also be used. Elastomer 140 also includes a lip which fills the region 135 that is formed between edge surfaces 119 and 133 (FIG. 5) and region 136 formed between end surfaces 123 and 134 (FIG. 7). A recess 142 is left between the elastomer layer 140 and outer surface 114 of sleeve 24. The recess 142, which is preferably approximately 0.12 inches, helps prevent the elastomer 140 from becoming torn or punctured during drilling operations and while the tool 10 is being inserted or withdrawn from the borehole. During manufacture, the elastomer 140 is vulcanized so as to be retained in slots 121 atop insert 130 and within regions 135 and 136 around the perimeter of inserts 130. The slots 121 permit passage of the desired electromagnetic waves to and from the coils 100 of transmitters T1–T4 and receivers R1 and R2, but prevent the intrusion of drilling fluid. The beveled edges and ends of slots 121 allow the elastomer layer 140 to seal even tighter when hydrostatic pressure is applied to logging tool 10. The beveled edges of the inserts 130 and the slots 121 and the rigidity of the inserts 130 also help prevent the elastomer 140 from being extruded into recesses 60 by the enormous hydrostatic downhole pressures. The inserts 130 also provide a puncture resistant barrier for elastomer 140.

Although a sleeve 24 may be constructed without the use of inserts 130, in which case elastomer 140 will be relied upon exclusively to seal slots 121, the use of inserts 130 is preferred for the reasons explained above, and because insert 130 reduces the volume of elastomer needed to effect the seal and thereby reduces the swelling of elastomer 140 which occurs in high temperature environments. Such swelling is undesirable as it can decrease the seal integrity and can swell beyond the outer surface 114 of sleeve 24, making it more susceptible to punctures and tears. Without regard, however, to whether slots 121 include inserts 130 or are instead sealed and filled solely by elastomer 140, slotted regions 120 provide electromagnetically transparent windows allowing antenna coils 100 to send and receive the desired signals from within sleeve 24.

Disposed circumferentially about the outer surface 114 of sleeve 24 are hardfaced bands 118 best shown in FIGS. 2B and 6. As shown in FIG. 1, one hardfaced band 118 is disposed on each side of slotted regions 120. Where slotted regions 120 are closely positioned, a single hardfaced band 118 may be disposed therebetween as shown between receivers R1 and R2 in FIG. 1. The hardfacing material may be, for example, tungsten carbide or any other such hardfacing composition known to those skilled in the art. Preferably, bands 118 are approximately 2.5 inches wide and ⅛ inch thick as measured from outer sleeve surface 114. These hardfacing bands 118 provide a bearing surface for tool 10 and prevent the surrounding formation from abrading the sleeve 24. Hardfacing bands 118 also serve to further distance elastomer 140 from the formation so as to lessen the likelihood of damage to the antenna coils 100 and the elastomeric layers 140 in slots 121.

Referring again to FIG. 2C, sleeve 24 includes an inwardly-facing lower key 129 adjacent to its lower end 112. Sleeve 24 further includes a pair of through bores 128, adjacent upper sleeve end 110 for receiving roll pins 93 (FIG. 2B) when sleeve 24 is inserted onto mandrel 22. Lower key 129 is sized so as to fit within lower keyway 95 formed in mandrel body 28. Key 129 and keyway 95 provide the correct angular or rotational orientation between sleeve 24 and mandrel 22 such that the through bores 128 in sleeve 24 align with upper keyways 92 in mandrel body 28. Together, pins 93, keyways 92, through bores 128, key 129 and keyway 95 cooperate to prevent downhole torque from disconnecting sleeve 24 from mandrel body 26.

During assembly of logging tool 10, the upper end 110 of sleeve 24 is disposed about pin 29 of mandrel 22 and the sleeve is rotated until key 129 is aligned with keyway 95 on the mandrel body 28. Sleeve 24 is then slidingly positioned such that upper sleeve end 110 abuts sleeve shoulder 78 on mandrel body 28. With lower key 129 in keyway 95, and with sleeve end 110 abutting sleeve shoulder 78, through bores 128 adjacent to upper sleeve end 110 become aligned with the upper keyways 92. A roll pin 93 is inserted into each upper keyway 95 and through bore 128 to retain the sleeve 24 in position on mandrel body 28. So positioned, one of the slotted regions 120 is disposed about each recess 60 and antenna coil 100. With sleeve 24 covering all of the antenna recesses 60 and being sealed at each end by seals 85, 87, it will be understood by those skilled in the art that all the electronics compartments 70, antenna recesses 60 and wire channels 80 are interconnected and sealed such that all will operate at atmospheric pressures. Given this important feature, it can be appreciated that the special and expensive hermetic electrical feedthrough connectors or bulkheads need not be used within mandrel body 28 for making interconnections between antenna coils 100 and circuit boards 102.

Sleeve 24 thus provides a removable protective cover for physically protecting multiple antenna array and associated signal conditioning circuitry in an atmospheric cavity in an induction logging tool. The sleeve seals the antennas and electronics from the potentially damaging hydrostatic pressures experienced downhole, while allowing the electromagnetic signals to be transmitted into and received back from the formation surrounding the borehole. The sleeve 24 covers all antennas and electronic packages in the device and is easily removable in the field should repairs or reconfiguration of the instrumentation and antenna arrays be required. The hardfacing bands around the outside of the sleeve help protect the sleeve and the antenna arrays from physical abuse that is typically experienced during MWD operations.

While the preferred embodiment of the invention has been shown and described, modifications thereof can be made by one skilled in the art without departing from the spirit and teachings of the invention. The embodiment described herein is exemplary only, and is not limiting. Many variations and modifications of the invention and apparatus disclosed herein are possible and are within the scope of the invention. Accordingly, the scope of protection is not limited by the description set out above, but is only limited by the claims which follow, that scope including all equivalents of the subject matter of the claims.

What is claimed is:

1. A well logging device for use in a borehole containing fluids, comprising:

a generally cylindrical support member for use in a drill string;

a plurality of axially spaced-apart recesses formed in the outer surface of said support member;

a plurality of antenna arrays carried by said support member, each of said arrays being retained in one of said spaced-apart recesses;

a metallic tubular sleeve disposed about said support member and covering said plurality of recesses and sealing said recesses from the fluids in the borehole, said sleeve being slidably removable from said support member so as to provide access to said plurality of antenna arrays on said support member; and means for sealing between said support member and said sleeve.

2. The logging device of claim 1 wherein:

said tubular sleeve comprises a slotted region covering at least one of said recesses, said slotted region having a plurality of slots formed through the thickness of said sleeve and spaced-apart around the circumference of said sleeve; and wherein said slots are filled with a non-metallic material.

3. The logging device of claim 2 wherein said thickness of said sleeve is defined by an outer surface and an inner surface and wherein said slots are wider at said outer surface than at said inner surface.

4. The logging device of claim 3 wherein said slots include beveled edges.

5. The logging device of claim 2 wherein said thickness of said sleeve is defined by an outer surface and an inner surface and wherein said slots are longer at said outer surface than at said inner surface.

6. The logging device of claim 2 further comprising hardfacing material disposed on said outer surface of said sleeve adjacent to at least one of said slotted regions.

7. The logging device of claim 6 wherein said hardfacing material comprises a band of hardfacing material circumferentially disposed about said sleeve.

8. The logging device of claim 1 wherein said sealing means comprises:

a first annular seal disposed between said support member and said sleeve and positioned at a first location;

a second annular seal disposed between said support member and said sleeve and positioned at a second location axially spaced-apart from said first location; and wherein said plurality of recesses are formed in said support member at locations between said first and second seals.

9. The logging device of claim 8 wherein said first and second seals are disposed in grooves formed in said support member.

10. A subassembly for a well logging device for use in a borehole containing fluids, comprising:

an elongate and generally cylindrical member;

a plurality of axially spaced-apart chambers formed in the outer surface of said elongate member;

a tubular metal sleeve disposed about said elongate member, said sleeve forming a closure for each of said chambers and sealing said chambers from the fluid in the borehole, and being slidingly removable from said elongate member so as to provide access to said chambers;

an instrumentation enclosure at one end of said elongate member for housing electrical apparatus; and a plurality of wireways in said elongate member, a different one of said wireways interconnecting each of said chambers with said instrumentation enclosure.

11. The subassembly of claim 10 further comprising seal means disposed at each end of said sleeve for sealing between said elongate member and said sleeve.

12. The subassembly of claim 11 wherein at least one of said chambers comprises:

a recess formed circumferentially about the outer surface of said elongate member; and a compartment formed adjacent to and intersecting said recess.

13. The subassembly of claim 10 further comprising:

a longitudinal bore in said elongate member for conducting drilling fluid therethrough;

wherein said plurality of wireways are circumferentially spaced-apart about said bore.

14. The subassembly of claim 11 wherein said sleeve covers each of said chambers and seals each of said chambers and each of said wireways such that the pressure within said chambers and said wireways is the same.

15. The subassembly of claim 11 wherein said elongate member includes an upper end and a lower end and a tapered region along its outer surface adjacent to its upper end; and wherein said sleeve includes an upper end and a lower end and a tapered region along its inner surfaces adjacent to its upper end; and wherein said tapered region of said elongate member and said tapered region of said sleeve engage one another when said sleeve is disposed about said elongate member.

16. The subassembly of claim 15 wherein said outer surface of said upper end of said elongate member and said inner surface of said upper end of said sleeve are correspondingly tapered so that said sleeve engages said elongate member more tightly when said sleeve is forced in the direction toward said upper end of said elongate member.

17. The subassembly of claim 11 wherein said sleeve is retained on said elongate member by at least one pin.

18. The subassembly of claim 11 wherein said sleeve and said elongate member are keyed together.

19. The subassembly of claim 11 further comprising:

a key extending from the inner surface of said sleeve;

a keyway formed in said elongate member for receiving said key;

wherein said key and said keyway cooperate to fix the relative angular positions between said sleeve and said elongate member when said sleeve is disposed about said elongate member.

20. The subassembly of claim 11 wherein said sleeve includes electromagnetically transparent window segments covering each of said chambers.

21. Well logging apparatus for use in a borehole containing fluids, comprising:

an elongate body adapted to be connected in a drill string, said body including a generally cylindrical outer surface;

a circumferential recess formed on said outer surface of said body;

an antenna coil supported in said recess;

a tubular metallic sleeve disposed over said body and sealing said antenna coil from the fluids in the borehole, said sleeve having an outer surface facing said borehole and an inner surface facing said outer surface of said elongate body, and having an electromagnetically transparent tubular segment disposed about said recess, and being slidingly removable from said elongate body for providing access to said antenna coil in said recess.

22. The logging apparatus of claim 21 wherein said electromagnetically transparent tubular segment comprises a slotted section of said sleeve, said slotted section having a plurality of slots formed through said sleeve and circumferentially spaced-apart about the circumference of said sleeve.

23. The logging apparatus of claim 22 wherein said slots include a layer of non-metallic sealant disposed in said slot.

24. The logging apparatus of claim 23 wherein said slots further include an insert disposed in said slot beneath said sealant layer, said insert including an upper surface facing said sealant layer and a lower surface facing said outer surface of said elongate body.

25. The logging apparatus of claim 24 wherein said insert is made of an insulative plastic.

26. The logging apparatus of claim 23 wherein said slots include beveled edge surfaces such that said slots are wider at said outer surface of said sleeve than they are at said inner surface of said sleeve.

27. The logging apparatus of claim 26 wherein said slots include beveled end surfaces such that said slots are longer at said outer surface of said sleeve than they are at said inner surface of said sleeve.

28. The logging apparatus of claim 24 wherein said slots include beveled edge surfaces, said slots being wider at said outer surface of said sleeve than they are at said inner surface of said sleeve; and wherein said inserts include beveled edge surface, said inserts being wider at said upper surface than they are at said lower surface; and wherein said edge surfaces of said inserts and said slots have different degrees of bevel such that a space is formed between a portion of said edge surface of said slot and a portion of said edge surface of said insert; and wherein said sealant layer extends into and substantially fills said space.

29. The logging apparatus of claim 24 wherein said sealant layer is disposed atop said upper surface of said insert and also includes a lip disposed around the perimeter of said insert between a portion of the edge surfaces of said insert and said slot.

30. The logging apparatus of claim 23 wherein said sealant layer is recessed from said outer surface of said sleeve.

31. The logging apparatus of claim 24 wherein said sealant layer is recessed from said outer surface of said sleeve.

32. The logging apparatus of claim 23 further comprising:

a compartment formed in said elongate body for housing electronic circuitry associated with said antenna coil, said sleeve forming a closure for said compartment and sealing said compartment from the fluids in said borehole.

33. The logging apparatus of claim 32 wherein said compartment intersects said circumferential recess such that said recess and said compartment form a continuous chamber.

34. The logging apparatus of claim 23 further comprising:

hardfacing material disposed on said outer surface of said sleeve adjacent to said slotted section.

35. The logging apparatus of claim 34 wherein said hardfacing material comprises a band of hardfacing material circumferentially disposed about said sleeve.

36. The logging apparatus of claim 35 further comprising a pair of hardfacing bands axially spaced-apart on said sleeve, one of said bands being disposed on each side of said slotted region.

37. The logging apparatus of claim 21 wherein said elongate body and said sleeve each includes an upper end and a lower end; and wherein said upper end of said body includes a tapered region on its outer surface such that said body is larger in diameter adjacent said upper end than at said lower end; and wherein said upper end of said sleeve includes a tapered region on its inner surface such that the inside diameter of said sleeve is larger adjacent said upper end than at said lower end; and wherein said upper tapered region of said sleeve receives said upper tapered region of said elongate body when said sleeve is disposed about said body.

38. The logging apparatus of claim 37 wherein said upper tapered region on said sleeve comprises a series of adjacent counterbores formed therein, and wherein said upper tapered region on said elongate body comprises a series of adjacent segments of reduced diameter.

39. The logging apparatus of claim 33 wherein said recess and said compartment are maintained at atmospheric pressure.

40. A well logging device for use in a borehole containing fluids, comprising:

a generally cylindrical support member for use in a drill string;

a plurality of axially spaced-apart recesses formed in the outer surface of said support member;

a plurality of antenna arrays carried by said support member, each of said arrays being retained in one of said spaced-apart recesses;

a tubular metal sleeve disposed about said support member and covering said plurality of recesses, said sleeve sealing said recesses from fluids in the borehole; and a slotted region of the sleeve covering at least one of said recesses, said slotted region having a plurality of slots formed through the thickness of said sleeve and spaced-apart around the circumference of said sleeve; and wherein said slots are filled with a non-metallic material.

41. The logging device of claim 40 wherein said thickness of said sleeve is defined by an outer surface and an inner surface and wherein said slots are wider at said outer surface than at said inner surface.

42. The logging device of claim 41 wherein said slots include beveled edges.

43. The logging device of claim 41 wherein said thickness of said sleeve is defined by an outer surface and an inner surface and wherein said slots are longer at said outer surface than at said inner surface.

44. The logging device of claim 41 further comprising hardfacing material disposed on said outer surface of said sleeve adjacent to at least one of said slotted regions.

45. The logging device of claim 44 wherein said hardfacing material comprises a band of hardfacing material circumferentially disposed about said sleeve.

46. The logging device of claim 40 further comprising sealing means comprising:

a first annular seal disposed between said support member and said sleeve and positioned at a first location;

a second annular seal disposed between said support member and said sleeve and positioned at a second location axially spaced-apart from said first location; and wherein said plurality of recesses are formed in said support member at locations between said first and second seals.

47. The logging device of claim 46 wherein said first and second seals are disposed in grooves formed in said support member.

* * * * *